Patented Mar. 31, 1942

2,278,372

UNITED STATES PATENT OFFICE 2,278,372

MANUFACTURE OF AMINES

John F. Olin, Grosse Ile, and Edward J. Schwoegler, Wyandotte, Mich., assignors to Sharples Chemicals Inc., a corporation of Delaware No Drawing. Application December 2, 1939, Serial No. 307,258

10 Claims. (Cl. 260—583)

The present invention pertains to the manufacture of amines by amination and reduction of aldehydes and ketones. The invention is related to the process described by Mignonac in "Comptes Rendus," volume 172, page 223, in that it involves reaction of a carbonyl compound with ammonia in the presence of a mutual solvent, hydrogen and a hydrogenation catalyst.

In accordance with the Mignonac process, a solvent such as ethyl alcohol is used. Reaction and separation conditions involved in the use of such a solvent are, however, far from ideal. Thus, when methyl ethyl ketone is treated with hydrogen and ammonia in an ethyl alcohol solvent in the practice of the Mignonac process, it is impossible to separate the desired amyl amine from the ethyl alcohol by simple distillation. Furthermore, the process results in formation of undesired by-products, including ethyl amyl ether and secondary amyl alcohol. Related ethers and undesired alcohols are similarly formed when other aliphatic or aromatic aldehydes or ketones are used as starting materials in the Mignonac process.

The present invention rests upon the discovery that aliphatic and aromatic aldehydes and ketones may be simultaneously reacted with ammonia and hydrogen in such a manner as to avoid the above difficulties, provided a polyhydric alcohol is substituted for ethyl alcohol as the mutual solvent. When ethylene glycol or glycerine is used as a mutual solvent, both the yield and conversion to the desired amine are improved as compared to the case in which a monohydric alcohol is used as the solvent. Furthermore, there is no difficulty in separating other constituents of the reaction mixture from the glycerine or glycol, since the polyhydric alcohol has a much higher boiling point than the constituents to be separated from it.

The invention is not limited to the use of the ethylene glycol or glycerine as the mutual solvent, since any normally liquid or relatively low melting polyhydric alcohol, such as sorbitol, 2-methyl glycerol, propylene glycol or butylene glycol may be employed. Substituted polyhydric alcohols, such as tri-ethanol amine, tri-propanol amine and other poly-alkanol amines may also be used as the mutual solvent.

The invention may be carried out according to the following procedure. The ketone or aldehyde to be converted into an amine is placed in an autoclave or other suitable pressure vessel together with the polyhydric alcohol solvent. The quantity of the solvent will vary from approximately 25% of the volume of the carbonyl compound to approximately 200% of its volume, depending upon other conditions. In general, when larger amounts of solvent are employed, the reaction is more rapid, and the pressure and temperature conditions necessary to effect conversion to the desired amine are also reduced. An active hydrogenating catalyst is next added to the solution of the carbonyl compound in the solvent. Platinum, paladium, nickel, nickel oxide, or other catalysts may be employed. Metallic nickel catalysts are preferred, however, both because of their high effectiveness in promoting the hydrogenation reaction, and because of their cheapness. The amount of catalyst may vary between 1 and 7% of the amount of aldehyde or ketone to be aminated, depending upon the reactivity of the particular aldehyde or ketone under treatment. An amount of finely divided catalytic nickel between 3 and 5% of the amount of carbonyl compound under treatment will usually be found sufficient to effect the desired catalysis.

After the catalyst is added, the autoclave is closed, and liquid ammonia is forced into the autoclave. The amount of ammonia used will vary from ⅓ mol. of ammonia per mol. of carbonyl compound to two or more mols. ammonia per mol. of carbonyl compound, depending upon whether a tri-substituted, di-substituted or mono-substituted amine is desired. Hydrogen is then run in from a cylinder until the quantity of hydrogen in the autoclave is sufficient to cause an increase of pressure of between 100 and 1000 pounds, as compared with the pressure before introduction of the hydrogen.

The autoclave is next heated during continuous agitation of the mixture. This heating is continued until the pressure in the autoclave drops rather suddenly, indicating that a substantial amount of hydrogen has been used up in hydrogenation of the carbonyl compound. The temperature at which this pressure drop occurs will vary, depending upon the particular carbonyl compound under treatment, and other conditions. It sometimes occurs slightly below 100° C., but in other cases may not occur until the temperature reaches approximately 170° C. It is sometimes preferable to heat the contents of the autoclave rapidly to a temperature of approximately 200° C. in order to accomplish the hydrogenation, although for most aldehydes and ketones, a moderately rapid reaction occurs between 120 and 140° C.

After the reaction is substantially complete;

i. e., when the drop in pressure indicates that the rate of absorption of hydrogen has become almost negligible, the excess hydrogen is bled off and the product transferred to a fractionating still, where it is separated into its constituents by fractional distillation. Since the polyhydric alcohol used as a mutual solvent is usually the highest boiling constituent passed to the autoclave, this solvent will remain as a still residue after all other constituents have been removed. This residue may then be returned to the autoclave and used as a mutual solvent for further quantities of the carbonyl compound and ammonia in the repeated practice of the reaction. Such return of the mutual solvent to the autoclave is advantageous in the practice of the process for two reasons. In the first place, some valuable material is recovered in this way. In the second place, the impurities present in the residue are, for the most part, impurities formed in the reaction, and the presence of these impurities in the subsequent reaction mixture thus tends to depress formation of similar impurities in the subsequent reaction, as will be understood by those skilled in the art.

In the above discussion, we have assumed that a batch process is to be employed in aminating and reducing the carbonyl compound to form the desired amine. It is also possible to manufacture amines by a process of this general character involving continuous operation. Thus, the carbonyl compound may be dissolved in a polyhydric alcohol solvent and the hydrogenating catalyst may be suspended in the solvent during the continuous flow of constituents through a hydrogenating and aminating plant. The solution of carbonyl compound in polyhydric alcohol solvent, together with the hydrogenation catalyst, may be pumped under pressure into a heated reaction zone, and ammonia and hydrogen may be simultaneously passed under pressure into that same zone, to accomplish the reaction. The use of a polyhydric alcohol as a mutual solvent for the ammonia and carbonyl compound has an additional advantage in a continuous process of this character, as well as the advantages referred to above. The polyhydric alcohol is sufficiently viscous to maintain the catalyst suspended during the passage of the materials through a continuous reaction apparatus, and deposit of the catalyst during the practice of the continuous process is thus avoided by the use of a polyhydric alcohol solvent instead of ethyl alcohol or similar solvent.

EXAMPLE I

*Manufacture of 2-amino pentane employing glycerine as solvent*

1720 grams of pentanone-2 and 1000 cc. of glycerine were placed in a 2-gallon stainless steel autoclave and 85 grams of finely divided nickel catalyst were added. 650 grams of anhydrous ammonia were then added by means of a bomb and hydrogen was introduced until the total pressure reached 900 lbs. per square inch, the mixture being stirred during addition of the hydrogen. The mixture was heated to 150° C., and hydrogen pressure was maintained at about 1000 lbs. per square inch until the induction of hydrogen ceased. The products of the reaction were removed from the autoclave and mixed with 500 cc. of water (the purpose of the addition of the water is to provide water to form a constant boiling mixture with 2-amino pentane). The mixture was distilled under a reflux condenser containing dry ice until a temperature of 60° C. was reached, to remove ammonia. The residue was then subjected to direct distillation, and 1938 grams of wet amine were obtained, boiling up to 87° C. This was dried with 50% caustic soda and redistilled to obtain a fraction boiling between 87 and 91° C. The conversion of the ketone to amine was 91%. Glycerine, excess water, and a small amount of pentanol-2 remained in the distillation flask after the initial wet distillation of the amine. This residue was subjected to additional distillation until the temperature of the liquid reached 200° C., most of the water and all of the secondary alcohol being thereby removed. The glycerine was re-used in the amination of a further quantity of pentanone-2 without further purification.

EXAMPLE II

*Manufacture of 2-amino pentane employing ethylene glycol as solvent*

This synthesis was carried out in exactly the same manner as in the preceding example, except that 1000 cc. of ethylene glycol were employed instead of the glycerine. 1540 grams of 2-amino pentane were obtained from 1720 grams of pentanone-2, affording a conversion of 88.5%.

EXAMPLE III

*Manufacture of 2-amino butane employing glycerol as a solvent*

1440 grams of butanone-2 (20 mols.), 685 grams of anhydrous ammonia (40 mols.), 1000 cc. of glycerine and 1000 grams of moist Raney nickel catalyst were placed in a 2-gallon stainless steel autoclave. Hydrogen was introduced, and the autoclave was heated to a temperature between 150 and 168° C. under a hydrogen pressure between 1300 and 1500 lbs. per square inch for 19 minutes. After the autoclave had cooled, the catalyst was removed by filtration, and ammonia was distilled from the reaction mixture as in Example I. The residue was further distilled as described in Example I, with the result that 1327 grams of high titre 2-amino butane were obtained, corresponding to a conversion of 90.9%.

EXAMPLE IV

*Manufacture of 2-amino pentane employing propylene glycol as a solvent*

1720 grams (20 mols.) of pentanone-2 were placed in a 2-gallon autoclave together with 1000 cc. of propylene glycol. 100 grams of moist Raney nickel catalyst were added to the mixture. The autoclave was then closed and 600 grams of ammonia introduced with stirring. The autoclave was heated to a temperature between 120 and 146° C. for one hour, while maintaining a hydrogen pressure of between 325 lbs. per square inch and 1300 lbs. per square inch. The desired amine was isolated from the reaction mixture by direct distillation in the form of a constant boiling mixture with water. The amine was dried with 50% caustic soda solution, and on refractionation, 1549 grams of 2-amino pentane were obtained, corresponding to a conversion of 89%.

While we have referred in the above discussion to the practice of the invention in treating aldehydes and ketones with ammonia to effect simultaneous amination and hydrogenation, it will be understood that various primary and secondary amines may be substituted for ammonia in the practice of the invention, since such amines are equivalent to ammonia in that they react similarly to ammonia when used in the practice of the invention as described above.

Still further modifications will be obvious to those skilled in the art, and we do not therefore wish to be limited except by the scope of the sub-joined claims.

We claim:

1. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a solvent consisting of a lower, saturated, aliphatic, polyhydric alcohol until amination and reduction of said carbonyl compound have taken place to form the desired amine.

2. In the formation of amines by the catalytic reaction of hydrogen, ammonia and an aldehyde, the step of conducting the reaction by heating the reactants to a point below the decomposition temperature of the amine to be formed, in the presence of a solvent consisting of a lower, saturated, aliphatic, polyhydric alcohol until amination and reduction of said carbonyl compound have taken place to form the desired amine.

3. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of a solvent consisting of a lower, saturated, aliphatic, polyhydric alcohol containing between 2 and 4 carbon atoms until amination and reduction of said carbonyl compound have taken place to form the desired amine.

4. In the formation of amines by the catalytic reaction of hydrogen, ammonia and an aldehyde containing between 1 and 5 carbon atoms, the step of conducting the reaction by heating the reactants to a point below the decomposition temperature of the amine to be formed, in the presence of a solvent consisting of a lower, saturated, aliphatic, polyhydric alcohol until amination and reduction of said carbonyl compound have taken place to form the desired amine.

5. In the formation of amines by the catalytic reaction of hydrogen, ammonia and a ketone containing between 1 and 5 carbon atoms, the step of conducting the reaction by heating the reactants to a point below the decomposition temperature of the amine to be formed, in the presence of a solvent consisting of a lower, saturated, aliphatic, polyhydric alcohol until amination and reduction of said carbonyl compound have taken place to form the desired amine.

6. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of glycerine until amination and reduction of said carbonyl compound have taken place to form the desired amine.

7. In the formation of amines by the catalytic reaction of hydrogen, ammonia and a member of the group consisting of aldehydes and ketones, the step of conducting the reaction by heating the reactants to a point below the decomposition temperature of the amine to be formed, in the presence of ethylene glycol until amination and reduction of said carbonyl compound have taken place to form the desired amine.

8. In the formation of amines by the catalytic reaction of hydrogen, ammonia and a ketone, the step of conducting the reaction by heating the reactants to a point below the decomposition temperature of the amine to be formed, in the presence of a solvent consisting of a lower, saturated, aliphatic, polyhydric alcohol until amination and reduction of said carbonyl compound have taken place to form the desired amine.

9. In the formation of amines by the catalytic reaction of hydrogen, ammonia and an aldehyde, the step of conducting the reaction by heating the reactants to a point below the decomposition temperature of the amine to be formed, in the presence of a solvent consisting of a lower, saturated, aliphatic, polyhydric alcohol containing between 2 and 4 carbon atoms until amination and reduction of said carbonyl compound have taken place to form the desired amine.

10. In the formation of amines by the catalytic reaction of hydrogen, ammonia and a ketone, the step of conducting the reaction by heating the reactants to a point below the decomposition temperature of the amine to be formed, in the presence of a solvent consisting of a lower, saturated, aliphatic, polyhydric alcohol containing between 2 and 4 carbon atoms until amination and reduction of said carbonyl compound have taken place to form the desired amine.

JOHN F. OLIN.
EDWARD J. SCHWOEGLER.